US006809271B1

(12) United States Patent
Horsfall

(10) Patent No.: US 6,809,271 B1
(45) Date of Patent: Oct. 26, 2004

(54) PORTABLE LOAD INDICATING DEVICE FOR A RAIL VEHICLE

(75) Inventor: Paul Andrew Horsfall, Wakefield (GB)

(73) Assignee: Weighwell Engineering Limited (GB)

( * ) Notice: Subject to any disclaimer, the term of this patent is extended or adjusted under 35 U.S.C. 154(b) by 142 days.

(21) Appl. No.: 10/070,233

(22) PCT Filed: Aug. 31, 2000

(86) PCT No.: PCT/GB00/03333

§ 371 (c)(1),
(2), (4) Date: Jun. 14, 2002

(87) PCT Pub. No.: WO01/18505

PCT Pub. Date: Mar. 15, 2001

(30) Foreign Application Priority Data

Sep. 3, 1999 (GB) .............................................. 9920715

(51) Int. Cl.[7] .......................... G01G 19/04; G01G 21/00
(52) U.S. Cl. ...................................... 177/126; 177/163
(58) Field of Search .............................. 177/126, 127, 177/132–135, 163

(56) References Cited

U.S. PATENT DOCUMENTS

| 1,913,915 | A | * | 6/1933 | Broscombe | 177/134 |
| 1,917,080 | A | * | 7/1933 | Aihara | 177/146 |
| 3,714,997 | A | * | 2/1973 | Ahl et al. | 177/136 |
| 3,949,822 | A | * | 4/1976 | English et al. | 177/126 |
| 4,015,675 | A | * | 4/1977 | Stanev | 177/1 |

FOREIGN PATENT DOCUMENTS

| GB | 1368108 | 9/1974 |
| GB | 1368115 | 9/1974 |
| GB | 1463958 | 2/1977 |
| GB | 2315559 | 2/1998 |

* cited by examiner

*Primary Examiner*—Randy W. Gibson
(74) *Attorney, Agent, or Firm*—Trexler, Bushnell, Giangiorgi, Blackstone & Marr, Ltd.

(57) ABSTRACT

The apparatus includes two somewhat convex shoes clampable along the adjacent sides of a pair of rails for engagement by the peripheries of wheel flanges so that the wheels are raised just clear of the rails, a load-sensing device at the highest portion of each shoe, and load-indicating means connected to the devices. The apparatus is sectional, the shoes being urged apart into rigidly clamped positions by two struts separable from the shoes to facilitate portability. Two spaced-apart support members are secured to each shoe to embrace its outer and lower faces, each support member being vertically adjustable relative to the shoe to suit different heights of rails. The shoes have replaceable wear-strips.

13 Claims, 3 Drawing Sheets

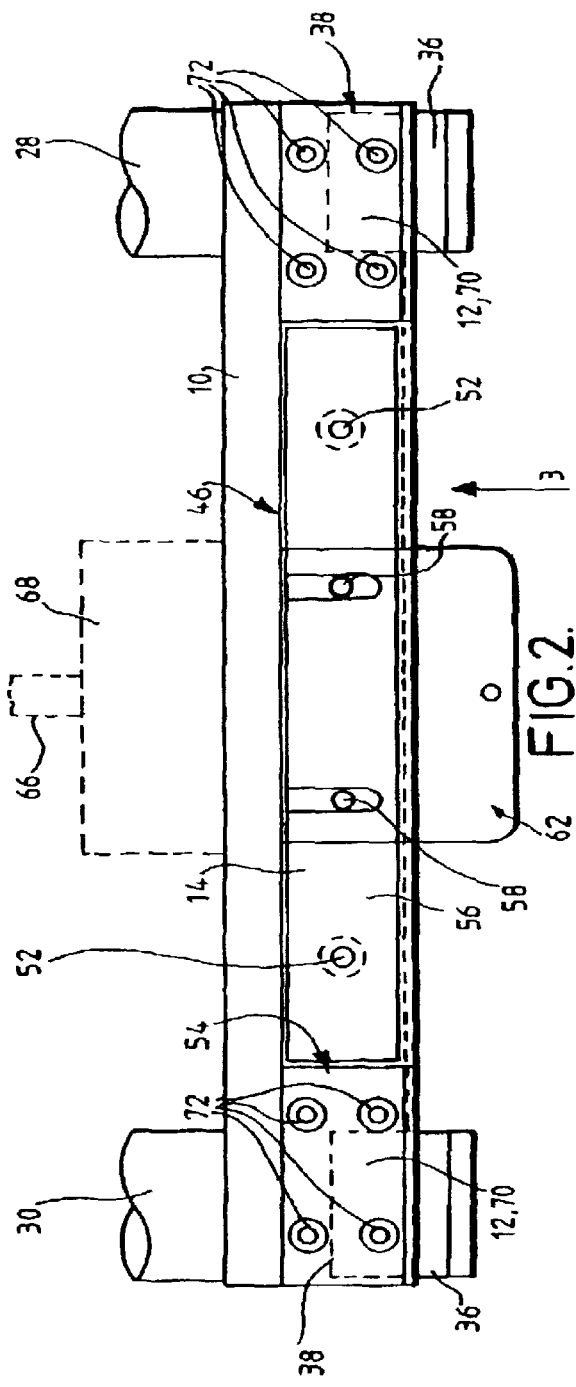
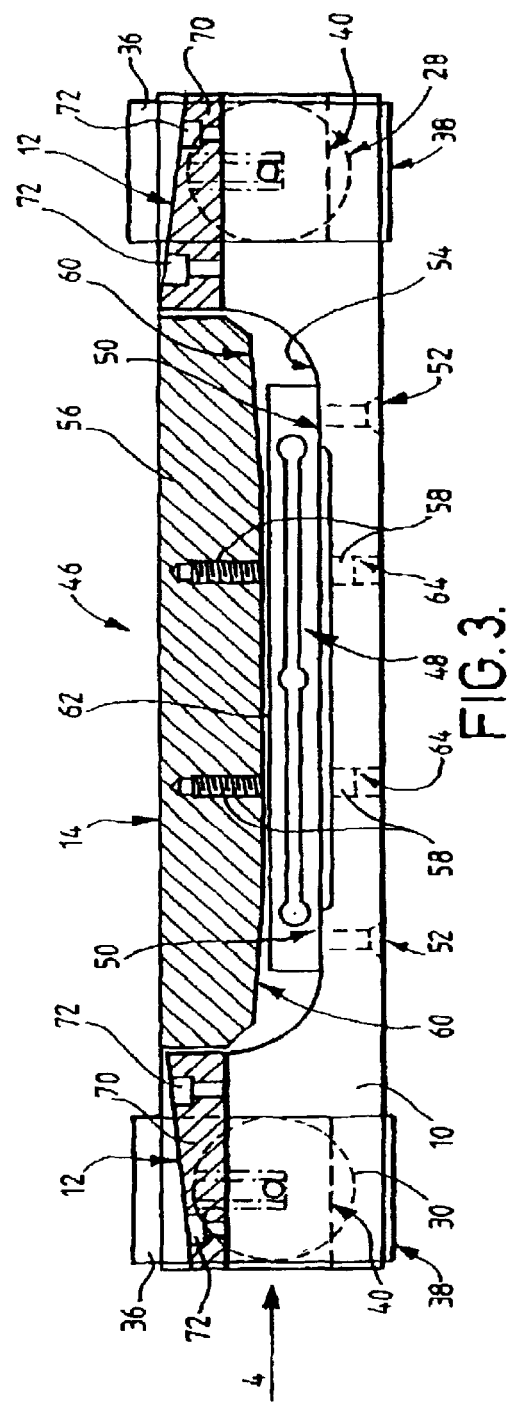

PORTABLE LOAD INDICATING DEVICE FOR A RAIL VEHICLE

RELATED/PRIORITY APPLICATION

This application claims priority with respect to British Application No. 9920311.9, filed Aug. 28, 1999.

This invention relates to apparatus for indicating the load imposed by each axle and/or each wheel of a rail vehicle.

It is necessary to check such loads statically, for example after the assembly of a bogie, because rail track systems impose limits on the weight of rolling stock to prevent excessive wear of the rails. This has previously required a fixed installation, usually a weigh-bridge, to which the bogie must be transported. This is a time-consuming operation, and an accuracy of less than about 10 kilograms is not obtainable. Furthermore with the advent of rail privatisation, it is likely that rail track systems will charge rolling stock operators by the weight of a train instead of by its length as at present, so that the dynamic checking of the loads imposed by all the axles of a moving train will become necessary. It is a time-consuming and costly operation to drive a whole train to a remote fixed weighing installation.

Our U.K. Patent Application No: 9715092.4, now U.K. Patent No. 2,315,559, discloses load-indicating apparatus which is sectional so as to be portable and capable of installation on any length of existing conventional track. The apparatus is rendered sectional by comprising two identical frames which are connectable by means enabling them to be urged apart, the means being disposed at the mid-point of the gap between the rails. This mid-point connection has been found not to provide sufficient rapidity for accurate load indication.

The object of the present invention is to provide sectional load-indicating apparatus having superior rigidity to that of our aforesaid application. A further object is to provide such apparatus which is even more readily portable.

According to the invention, apparatus for indicating the load imposed by each axle and/or each wheel of a railway vehicle comprises two substantially convex carrier shoes adapted to be urged apart into clamped position along the adjacent sides of a pair of rails so as to be engageable by the peripheries of the flanges of the wheels on an axle whereby the tyres of said wheels are raised just clear of the rails, a load-sensing device disposed at the highest portion of each shoe, and load-indicating means connected to said devices, wherein the apparatus is sectional, the apparatus being characterised in that the shoes are adapted to be urged apart into their clamped positions by means of two struts each of which extends between the shoes to enhance the rigidity of the apparatus whilst being readily separable from the shoes to facilitate portability of the struts and shoes.

Each strut preferably abuts, when in operative position, at one end against one of the shoes and at the other end against a nut on a screw-threaded spigot rigidly secured to the other of the shoes.

Preferably, each strut is tubular and fits closely at said one end over a plain spigot rigidly secured to one of the shoes and at the other end over that end of the screw-threaded spigot remote from the other of the shoes.

Preferably, also, each shoe has rigidly secured to it one screw-threaded spigot and one plain spigot whereby both shoes have the same uniform configuration.

Each shoe preferably has at least one carrying handle rigidly secured to it.

Preferably, each device comprises a load-sensing cell fixedly mounted near both of its ends on lands in a recess in the associated shoe, and a load-plate spaced above and rigidly secured to a central zone of said cell, the upper surface of the load-plate being substantially flush with the highest portion of the shoe.

The load-indicating means may be a computer capable of showing and recording the load imposed by individual axles and/or individual wheels.

Alternatively, the load-indicating means may be a digital indicator capable of showing the load imposed by individual axles and/or individual wheels.

Preferably, at least one support member is secured to each shoe so as effectively to embrace the outer and lower faces of the shoe, the or each support member being adjustable in height to suit the cross-sectional profiles of different types of rails.

Preferably, also, two spaced-apart support members are secured to each shoe.

The shoes are preferably provided with replaceable wear-strips aligned with the load-tensing devices for engagement by the peripheries of the flanges of the wheels.

A preferred embodiment of the invention will now be described, by way of example only, with reference to the accompanying drawings, of which:

FIG. 2 is a plan view on a larger scale of a load-sensing device forming part of said apparatus;

FIG. 3 is a side elevation of the load-sensing device in the direction of arrow 3 in FIG. 2.

Figure 1:
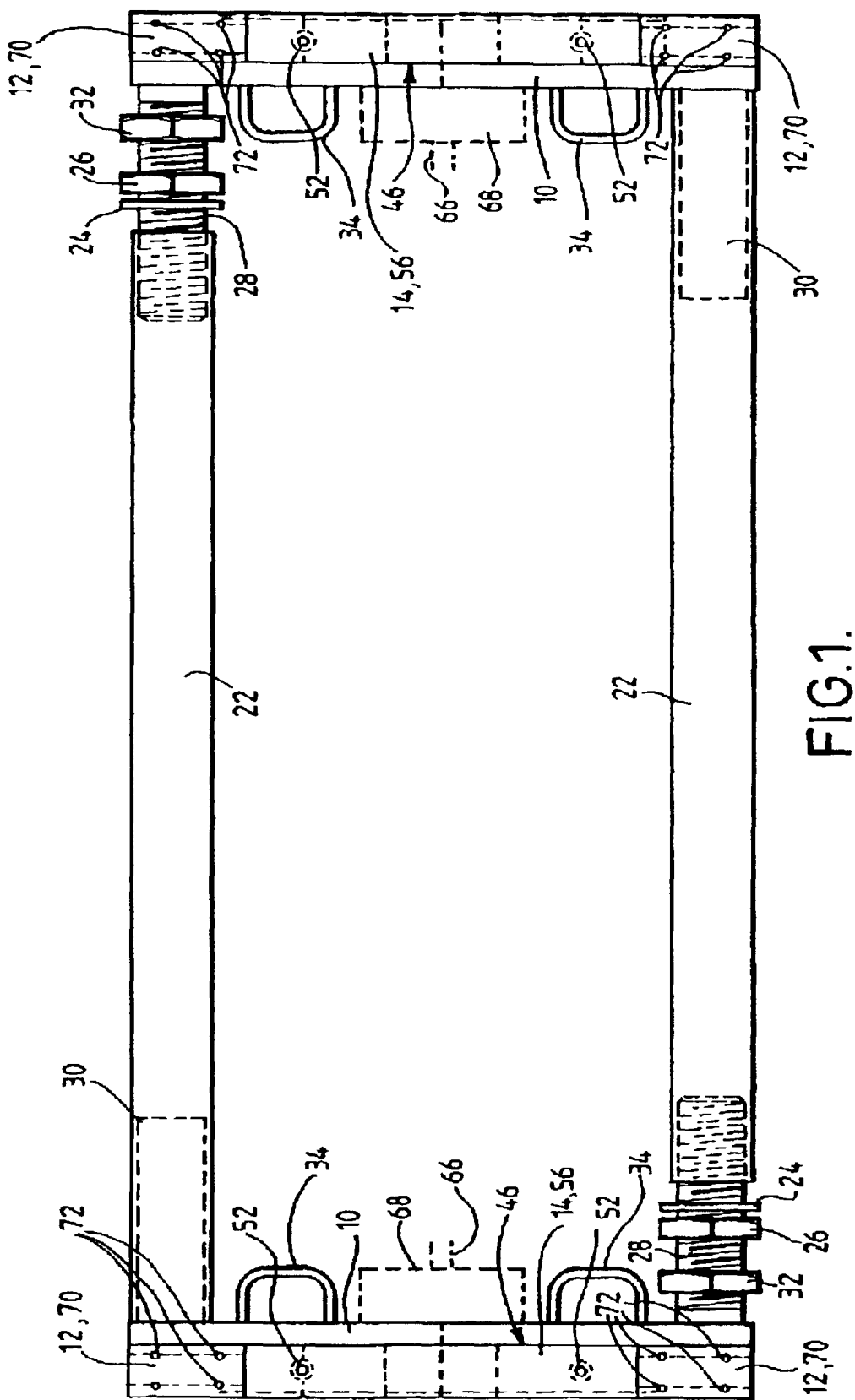
FIG. 1 is a plan view of portable apparatus for indicating the load imposed by each axle and/or each wheel of a rail vehicle, with conventional electrical components omitted.

Referring now to FIG. 1 of the drawings, apparatus for indicating the load imposed by each axle and/or each wheel of rail vehicle is sectional to facilitate its portability, and includes two solid carrier shoes 10. Each shoe 10 is short enough to fit between adjacent rail clamps on a length of conventional track, and is substantially convex in the sense that its top surface has plane end portions 12 inclined downwardly at an angle of, say, two to five degrees from its central highest plane portion 14 as shown in FIG. 3. The shoes 10 are adapted to be urged apart to clamp them with a very high degree of rigidity along and against the adjacent sides of a pair of rails such as 16 (see FIG. 4) by means of two spaced-apart parallel struts 22 each of which extends effectively over the full distance between the shoes 10 as clearly shown in FIG. 1 whilst being readily separable from the shoes 10. To this end, each strut 22 abuts, when in its operative position shown in FIG. 1, at one end against one of the shoes 10 and at the other end against a washer 24 and a nut 26 on a screw-threaded spigot 28 rigidly secured by welding to the other of the shoes 10. Each strut 22 is tubular and fits closely at said one end over a plain spigot 30 rigidly secured by welding to one of the shoes 10 and at said other end over that end of the screw-threaded spigot 28 remote from the other of said shoes. Each shoe 10 has welded to it one screw-threaded spigot 28 and one plain spigot 30 whereby both shoes 10 have the same uniform configuration. Each of the screw-threaded spigots 28 also carries a lock-nut 32 which is tightenable against the nut 26. Each shoe 10 also has rigidly secured to it by welding two carrying handles 34. When the apparatus is unclamped, the separability of the struts 22 from the shoes 10 facilitates portability of the apparatus by allowing each strut and each shoe to be handled individually. Struts 22 of different lengths can be provided to suit different track gauges, that is to say different spacings between pairs of rails.

Figure 4:
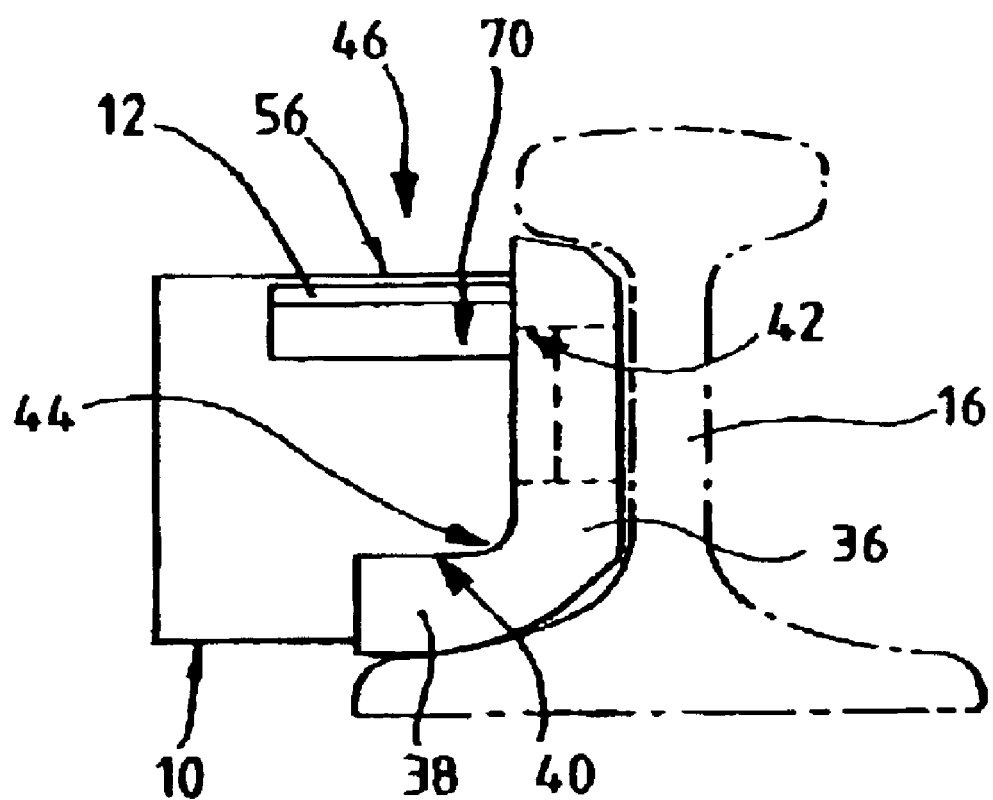
FIG. 4 is an end elevation of the load-sensing device in the direction of arrow 4 in FIG. 3, showing how said device co-acts with a rail.

Referring now to FIG. 4 of the drawings, two spaced-apart support members or keys 36 of L-shaped cross-section are secured to each shoe 10 by respective set-screws (not shown) each of which passes through a vertical slot 42 in the associated member 36 and engages in the shoe 10 so that the effective height of said shoe is adjustable. The horizontal base portion 38 of each member 36 fits within a rebate 40 in the associated shoe 10 when minimum effective height is required as shown. The shoe 10 and the member 36 are formed with complementary male and female radii 44 to provide stress relief in and thus maximum strength of the member 36. When the apparatus is fitted to a taller rail, packing pieces or shims (not shown) are inserted between the horizontal base portion 38 of each member 36 and the co-operating face of the rebate 40 as required. Mambers 36 of different outer and/or lower profiles, and/or of different sizes, can be provided to suit different types of rails. The arrangement is such that each member 36 rests on the base flange of the rail 16, regardless of the height of its profile, and effectively embraces the outer and lower faces of the associated shoe 10.

Referring now to FIGS. 2 and 3, a load-sensing device indicated generally at 46 is disposed at the highest portion 14 of each shoe 10 and comprises a load-sensing cell 48 fixedly mounted near both of its ends on two lands 50 by set-screws 52 in a recess 54 in each shoe 20, and a load-plate 56 is disposed above the cell 48 and rigidly secured by two cap-screws 58 to a central zone of said cell, the upper surface of the load-plate 56 being substantially flush with the highest portion 14 of said shoe. So that the load-plate 56 bears only upon the central zone of the cell 48, the end zones 60 of the lower surface of said load-plate are inclined as shown in FIG. 3. Thus the load-plate 56 can bear only upon the central zone of the cell 48 without introducing any stress raisers into its lower surface. A shim 62 is shown interposed between the central zone of the cell 48 and the load-plate 56 to assist in calibration of the apparatus. The heads of the cap-screws 58 are secured by way of clearance holes 64 in the base of the shoe 10. No overload stop means are provided for the cell 48, as the space between said cell and the base of the recess 54 is more than sufficient to accommodate deflection of said cell resulting from the maximum load imposed on the load-plate 56. Each cell 48 is connected to an electrical socket (not shown) in the associated shoe 10, and said socket can be connected by a plug (not shown) on wiring 66 to conventional load-indicating means (not shown) comprising a digital indicator or a personal computer. The plug and socket are protected against physical damage and any ingress of water by a metal cover 68 provided with suitable rubber seals (not shown). Relatively small bending moments are exerted on the shoe 10 enabling the base of the recess 54 to be made relatively shallow without risk of distortion, which in turn enables the load-plate 56 to be made relatively deep and therefore strong having regard to the overall height limit dictated by the cross-sectional profile of a rail. There are no screw-heads vulnerably disposed on the upper surface of the load-plate 56. The end portions 12 of the shoes 10 are provided with replaceable hardened inset wear-strips 70 secured by set-screws 72 in alignment with the load-sensing devices 46. For maximum hardness, strength and wear-resistance, tool steel and/or armour-plating steel is/are employed wherever appropriate.

In operation, the apparatus is clamped between an existing pair of rails at any convenient location however remote so that its support members 36 rest on the base flanges of the rails (see FIG. 4) while the upper faces of its shoes 10, and more precisely the load-plates 56 therein, are engageable by the peripheries or the flanges or toes of the wheels on an axle of a rail vehicle whereby the tyres of said wheels are raised just clear of, say about 4 millimetres above, the rails and the load imposed by the axle is borne by the cells 48. When approaching and leaving the load-plates 56, the peripheries of the flanges of the wheels run on the aforesaid wear-strips. The flanges remain safely between the rails at all times. Both static and dynamic loading can equally well be accurately measured, a digital indicator being capable of showing the loads imposed by individual axles and/or individual wheels and a outer being capable of showing and also recording said loads. Where the loads imposed by the axles and/or the wheel of a bogie are to be measured, a typical bogie with a total weight of around 5 tonnes is easily pushed into a checking position on the apparatus by four men.

In a modification, the shim 62 is omitted and the load-plate 56 bears directly upon the cell 48.

What is claimed is:

1. Apparatus for indicating the load imposed by each axle and/or each wheel of a railway vehicle comprising two substantially convex carrier shoes adapted to be urged apart into clamped positions along the adjacent sides of a pair of rails so as to be engageable by the peripheries of the flanges of the wheels on an axle whereby the tyres of said wheels are raised just clear of the rails, a load-sensing device disposed at the highest portion of each shoe, and load-indicating means connected to said devices, wherein the apparatus is sectional, characterised in that the shoes are adapted to be urged apart into their clamped positions by means of two struts each of which extends effectively over the full distance between the shoes to enhance the rigidity of the apparatus whilst being readily separable from the shoes to facilitate portability of the struts and shoes.

2. Apparatus according to claim 1 wherein each strut abuts, when in operative position, at one end against one of the shoes and at the other end against a nut on a screw-threaded spigot rigidly secured to the other of the shoes.

3. Apparatus for indicating the load imposed by each axle and/or each wheel of a railway vehicle comprising two substantially convex carrier shoes adapted to be urged apart into claimed positions along the adjacent sides of a pair of rails so as to be engageable by the peripheries of the flanges of the wheels on an axle whereby the tyres of said wheels are raised just clear of the rails, a load-sensing device disposed at the highest portion of each shoe, and load-indicating means connected to said devices, wherein the apparatus is sectional, characterised in that the shoes are adapted to be urged apart into their clamped positions by means of two struts each of which extends between the shoes to enhance the rigidity of the apparatus whilst being readily separable from the shoes to facilitate portability of the struts and shoes, each strut abuts, when in operative position, at one end against one of the shoes and at the other end against a nut on a screw-threaded spigot rigidly secured to the other of the shoes, each strut is tubular and fits closely at said one end over a plain spigot rigidly secured to one of the shoes and at the other end over that end of the screw-threaded spigot remote from the other of the shoes.

4. Apparatus according to claim 3 wherein each shoe has rigidly secured to it one screw-threaded spigot and one plain spigot whereby both shoes have the same uniform configuration.

5. Apparatus according to claim 1 wherein each shoe has at least one carrying handle rigidly secured to it.

6. Apparatus according to claim 1 wherein each device comprises a load-sensing cell fixedly mounted near both of its ends on lands in a recess in the associated shoe, and a load-plate spaced above and rigidly secured to a central zone of said cell, the upper surface of the load-plate being substantially flush with the highest portion of the shoe.

7. Apparatus according to any ones of claims 1, 2, 5 and 6 wherein the load-indicating means are a computer capable of showing and recording the load imposed by individual axles and/or individual wheels.

8. Apparatus according to any one of claims 1, 2, 5 and 6 wherein the load-indicating means are a digital indicator capable of showing the load imposed by individual axles and/or individual wheels.

9. Apparatus according to claim 1 wherein at least one support member is secured to each shoe so as effectively to embrace the outer and lower faces of the shoe, the or each support member being vertically adjustable relative to the shoe to suit different heights of rails.

10. Apparatus for indicating the load imposed by each axle and/or each wheel of a railway vehicle comprising two substantially convex carrier shoes adapted to be urged apart into clamped positions along the adjacent sides of a pair of rails so as to be engageable by the peripheries of the flanges of the wheels on an axle whereby the tyres of said wheels are raised just clear of the rails, a load-sensing device disposed at the highest portion of each shoe, and load-indicating means connected to said devices, wherein the apparatus is sectional, characterised in that the shoes are adapted to be urged apart into their clamped positions by means of two struts each of which extends between the shoes to enhance the rigidity of the apparatus whilst being readily separable from the shoes to facilitate portability of the struts and shoes, wherein two spaced-apart support members are secured to each shoe so as effectively to embrace the outer and lower faces of the shoe, the or each support member being vertically adjustable relative to the shoe to suit different heights of rails.

11. Apparatus according to claim 1 wherein the shoes are provided with replaceable wear-strips aligned with the load-sensing devices for engagement by the peripheries of the flanges of the wheels.

12. Apparatus according to any ones of claims 3 and 4 wherein the loader-indicating means are a computer capable of showing and recording the load imposed by individual axles and/or individual wheels.

13. Apparatus according to any one of claims 3 and 4 wherein the load-indicating means are a digital indicator capable of showing the load imposed by individual axles and/or individual wheels.

* * * * *